United States Patent
Gibboney, Jr.

[11] Patent Number: 5,994,845
[45] Date of Patent: Nov. 30, 1999

[54] ELECTRICAL LIGHT SOCKET

[75] Inventor: James W. Gibboney, Jr., Conyers, Ga.

[73] Assignee: Ventur Research & Development Inc., Suwanee, Ga.

[21] Appl. No.: 09/074,801

[22] Filed: May 8, 1998

Related U.S. Application Data

[63] Continuation-in-part of application No. 08/847,345, Apr. 24, 1997, Pat. No. 5,777,868.

[51] Int. Cl.$^6$ .................................................. H05B 37/03
[52] U.S. Cl. ..................... 315/185 S; 315/56; 315/185 R; 315/323; 363/146
[58] Field of Search ........................... 315/185 S, 185 R, 315/56, 323, 312; 363/146, 145, 141, 53, 126

[56] References Cited

U.S. PATENT DOCUMENTS

| | | | |
|---|---|---|---|
| D. 330,179 | 10/1992 | Rihm | D10/106 |
| D. 341,331 | 11/1993 | Richards, Jr. | D10/106 |
| 3,789,211 | 1/1974 | Bridges | 340/628 |
| 3,953,782 | 4/1976 | Means | 321/28 |
| 3,968,398 | 7/1976 | Lehmann et al. | 315/185 S |
| 4,075,614 | 2/1978 | White | 360/227.1 |
| 4,080,039 | 3/1978 | Ahroni | 339/147 |
| 4,211,955 | 7/1980 | Ray | 315/53 |
| 4,223,248 | 9/1980 | Tong | 315/185 S |
| 4,227,228 | 10/1980 | Cheng | 361/104 |
| 4,350,407 | 9/1982 | Tong | 339/113 |
| 4,418,978 | 12/1983 | Shamir | 339/99 R |
| 4,425,605 | 1/1984 | Cheng | 362/227 |
| 4,592,613 | 6/1986 | Tong | 339/147 |
| 4,623,878 | 11/1986 | Schoenwetter | 340/628 |
| 4,675,575 | 6/1987 | Smith et al. | 315/185 S |
| 4,682,079 | 7/1987 | Sanders et al. | 315/186 |
| 4,688,135 | 8/1987 | Leopold | 361/118 |
| 4,799,898 | 1/1989 | Schick | 439/418 |
| 4,997,393 | 3/1991 | Armando | 439/620 |
| 5,111,058 | 5/1992 | Martin | 307/66 |
| 5,111,113 | 5/1992 | Chu | 315/210 |
| 5,139,443 | 8/1992 | Armando | 439/620 |
| 5,160,879 | 11/1992 | Tortola et al. | 320/2 |
| 5,320,563 | 6/1994 | Liao | 439/622 |
| 5,345,147 | 9/1994 | Wu | 315/185 S |
| 5,384,559 | 1/1995 | Shamir | 337/197 |
| 5,396,221 | 3/1995 | Kramer | 240/10 R |
| 5,419,719 | 5/1995 | Chandler | 439/622 |
| 5,495,147 | 2/1996 | Lanzisera | 315/185 |
| 5,581,449 | 12/1996 | Sridharan | 363/146 |
| 5,670,847 | 9/1997 | Lin | 315/185 S |

*Primary Examiner*—Don Wong
*Assistant Examiner*—Tuyet Vo
*Attorney, Agent, or Firm*—Michael A. Mann; Nexsen Pruet Jacobs & Pollard LLP

[57] ABSTRACT

A light socket is disclosed that has a built-in integrated circuit for rectifying the alternating current received from an electrical outlet and limiting the direct current produced. The light socket is specifically suited for low-current, low-voltage applications such as supplying DC to a string of ornamental lights. The integrated circuit has a diode with a modified cathode that acts as a fuse as it is rectifying the alternating current. The cathode is formed of a plurality of electrically parallel conductors. Excessive current blows out at least some of these conductors in the same way a conventional fuse blows. Various embodiments add other current-limiting elements, elements for producing full wave or near full wave rectification, and for opening the circuit when they detect extraneous currents.

15 Claims, 3 Drawing Sheets

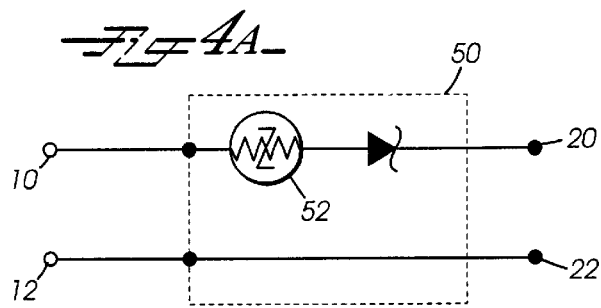
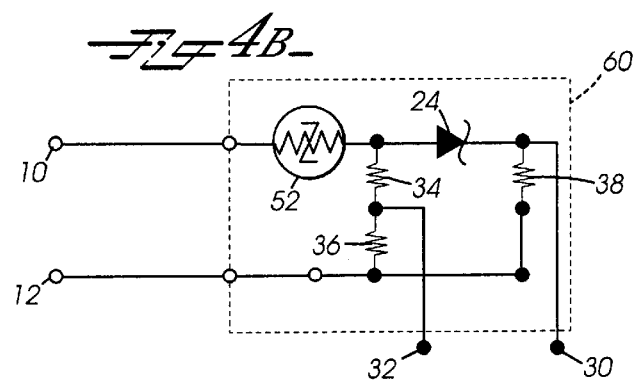
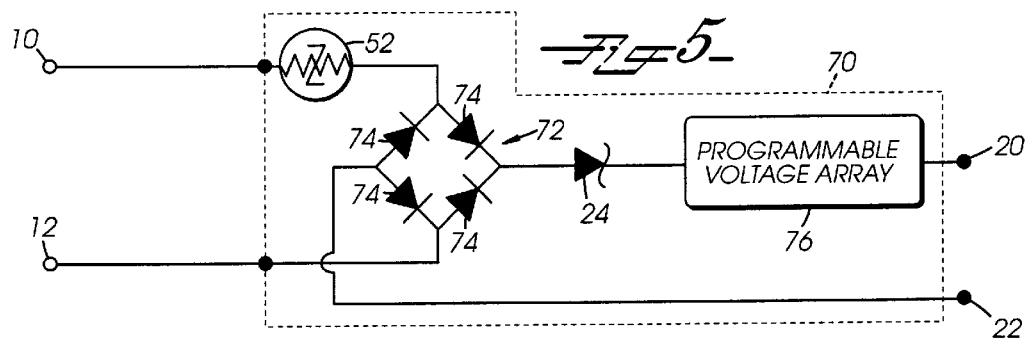
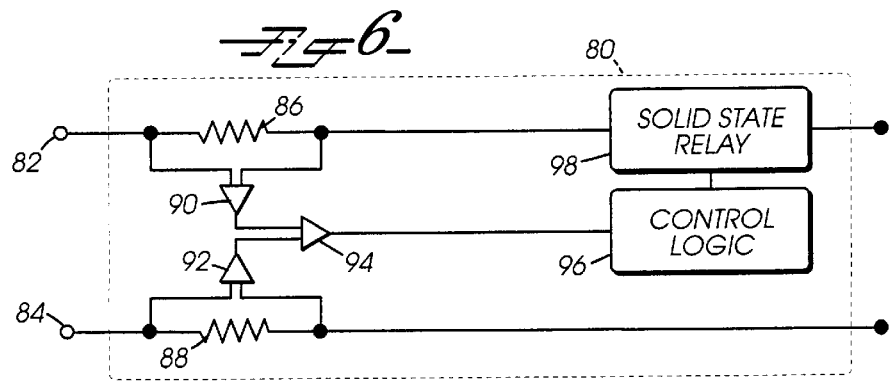

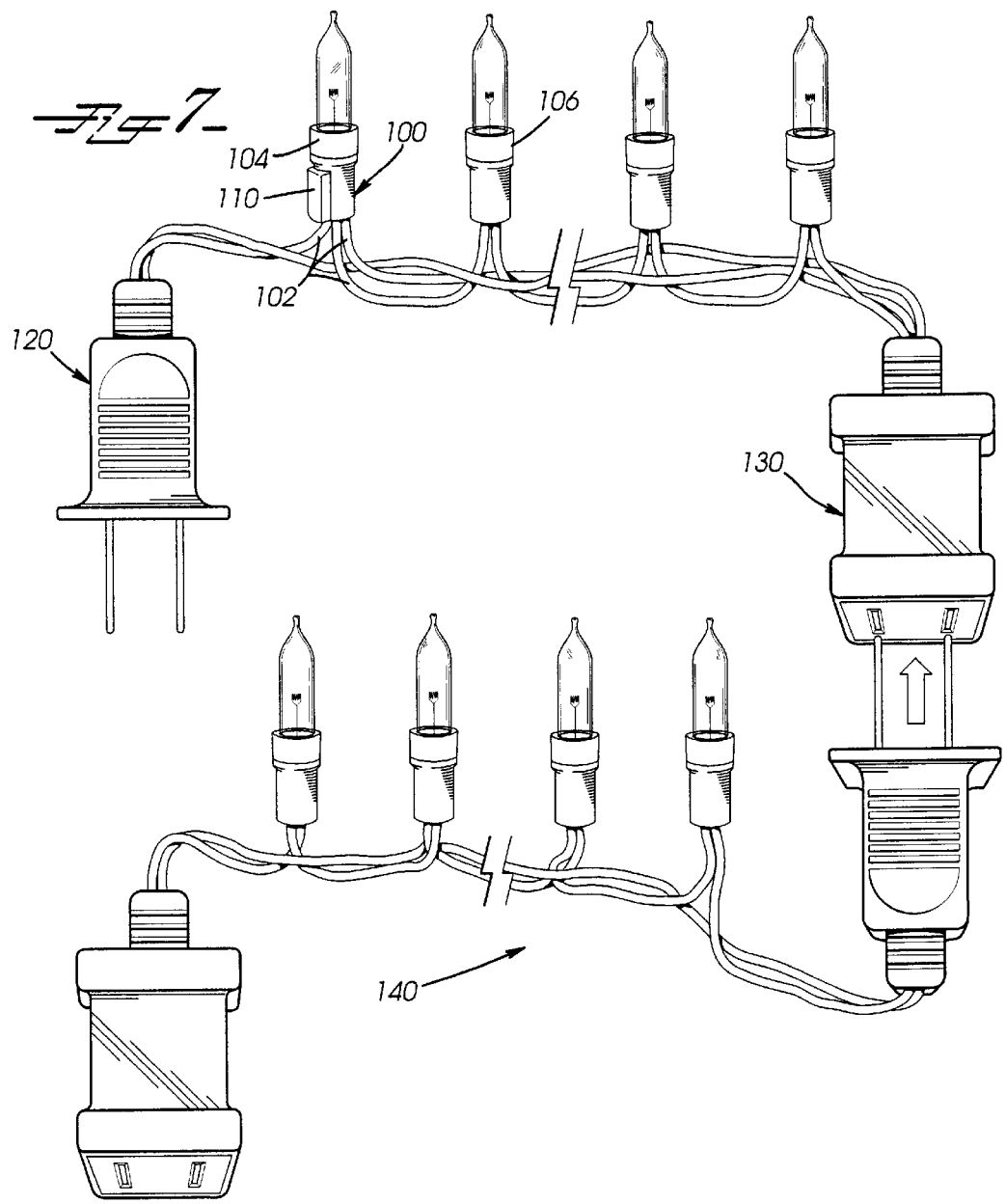
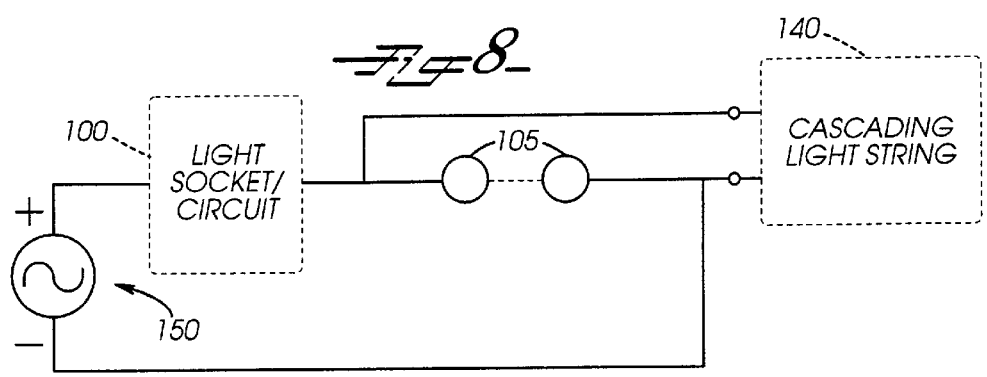

ELECTRICAL LIGHT SOCKET

This application is a continuation-in-part application of Ser. No. 08/847,345 which was filed Apr. 24, 1997, now U.S. Pat. No. 5,777,868.

BACKGROUND OF THE INVENTION

1. Field of the Invention

The present invention relates to small wattage electrical power needs such as ornamental light strings for decorating trees. In particular, the present invention relates to integrated circuits for rectifying and limiting current from an AC source.

2. Discussion of Background

Strings of individual, small wattage lights are widely used to decorate Christmas trees. Although these types of decorations are enjoyed by many people, they are sometimes a fire hazard, resulting in tragedies every Christmas holiday season. Most of these light strings draw a current of at least 200 ma at 120 VAC. Because of the concern over safety, these light strings may be made with heavier gauge wire, such as 22 gauge rather than 24. However, even though a single string of lights may be hazardous, the common practice of cascading multiple strings of lights from one wall socket compounds this inherent danger associated with a single string.

In addition to Christmas tree light strings, there are other applications for electrical power for devices that have low power needs and especially those that use direct current (DC) rather than alternating current (AC), including many devices that use integrated circuits, such as calculators or devices that use light-emitting diodes. AC or large voltage surges can ruin these types of devices.

There have been some attempts to make Christmas tree decorations safer. Many of these involve putting fire or smoke detectors in ornaments. An example of this can be found in U.S. Pat. No. 4,075,614 issued to White and in U.S. Pat. No. 5,396,221 issued to Bridges. Fuses have been incorporated into the plugs of light strings, as taught for example by Cheng in U.S. Pat. No. 4,227,228 and Lehmann et al in U.S. Pat. No. 3,968,398. However, none of these address all of the problems with these types of light strings.

Smith et al, in U.S. Pat. No. 4,675,575, describe a light string based on light-emitting diodes (LEDs) which can be driven by pulsed DC power, which in turn is powered by household AC voltage. The pulsed DC is produced by a silicon controlled rectifier from the AC input.

DC is not unknown in connection with Christmas tree lighting using more conventional type incandescent bulbs. See Wu's stages selection type Christmas tree light controller circuit in U.S. Pat. No. 5,345,147, and Kramer's decorative lighting system in U.S. Pat. No. 3,789,211. However, in both cases the DC power is used only tangentially in achieving a particular lighting effect and not to power the bulbs themselves.

Turning briefly to the figures, FIGS. 1A, 1B and 1C illustrate graphs of voltages versus time, with voltage represented by the vertical coordinate and time represented by the horizontal coordinate.

FIG. 1A illustrates an alternating current (AC), meaning that the current reverses the direction of flow. So-called household current varies between approximately ±60 volts and does so at approximately 60 times per second. Direct current (DC) does not change direction, although it may change amplitude. FIGS. 1B and 1C both illustrate DC; FIG. 1B shows half-wave DC and FIG. 1C shows full wave DC. Both also illustrate pulsed DC.

It is known to generate half-wave and full wave DC from AC by devices called converters or rectifiers. Devices for rectifying AC to DC are sometimes based on diodes, which are solid state circuit elements that conduct current in the forward direction but not in the reverse direction. For half-wave rectification, as illustrated in FIG. 1B, a single diode can exclude negative voltages, leaving only positive voltages. For full-wave rectification, two or four diodes are used.

Some of the patents identified above employ diodes in various functions in relation to power sources, such as disclosed by Smith et al. However, there remains a need for a better way to power low wattage devices and Christmas tree light strings in particular.

SUMMARY OF THE INVENTION

According to its preferred embodiments and briefly described, the present invention is a light socket on a light string containing an integrated circuit designed to yield a DC output to a low-current, low-voltage load such as, for example, the remaining lights on the light string and cascading light strings that might be used for decorating a Christmas tree.

Within the light socket, the novel and non-obvious elements and combinations of elements provide significant and, in some embodiments, redundant protection from current surges and current leakage while reducing energy consumption. Moreover, the resulting light is whiter than typical incandescent bulbs illuminated by AC.

An important advantage of the present invention is that it limits the number of lights strings which can be cascaded from the light string containing the light socket that includes the integrated circuit. Since many fires start each year due to overloading a wall outlet, restricting the number of strings that can be cascaded increases safety.

Another major advantage of the present invention is that it operates on a much lower current, typically one fifth the amperage of conventional light strings. This advantage results in reduced operating temperature for improved safety, and much lower power consumption—about one-tenth—which, translates into significant cost savings when the vast number of these types of light strings in use is considered. Notwithstanding the lower current requirements, the quality of light is improved and appears to be whiter light.

Another important advantage of the present invention is that the simplicity of the circuits translates into low manufacturing costs, in fact, significantly lower costs than conventional strings with heavier gauge wire.

Still other features of the present invention are certain circuit components that are included for safety reasons, for example, a special diode, to be described more fully herein, but which operates like a fuse. Also, the present circuit includes special current sensing devices that open the circuit to shut down the lights if an over-current condition arises from some internal and/or extraneous load condition, and diodes that prevent AC from getting to the lights.

Moreover, the presence of the circuit in a light socket protects not only all subsequent lights on the particular string, but also any light strings which are cascaded even if the strings do not contain the circuit.

Other features and their advantages will be apparent to those skilled in low wattage power supplies from a careful reading of the Detailed Description of Preferred Embodiments accompanied by the following drawings.

BRIEF DESCRIPTION OF THE DRAWINGS

In the figures,

FIGS. 4A and 4B are circuit diagrams according to third and fourth alternative preferred embodiments of the present invention, which are variations of the first and second embodiments, respectively;

FIG. 5 is a circuit diagram illustrating yet a fifth alternative embodiment of the present invention, which is a variation of the third embodiment of FIG. 4A;

FIG. 6 is a circuit diagram illustrating a circuit for use with any of the first through fifth embodiments of FIGS. 2–5;

FIG. 7 is an exterior front perspective view of a string of lights with first socket containing a circuit, according to a preferred embodiment of the present invention.

FIG. 8 is a schematic view of the a string of lights with the first socket containing a circuit, according to a preferred embodiment of the present invention.

DETAILED DESCRIPTION OF PREFERRED EMBODIMENTS

The present invention can be viewed from several standpoints. First, the present invention is circuitry for use in a light socket adapted to convert the alternating current received from the power source into direct current while monitoring the current level so that an overload will cause an interruption in power. It will be clear to those familiar with these types of devices that other applications, especially those that use integrated circuits, can employ the present circuitry in such a light socket.

The present invention is also a "string of lights", which means a plurality of incandescent light bulbs, each in one of a series of sockets adapted to apply an electric potential across the filament in the bulb so as to cause it to glow from resistance heating, each light being connected by electrically conducting wires so that it is electrically in series and/or in parallel with the other, and having the circuitry contained in the first light socket in the string of lights, which socket is in electrical connection with a power source wires and thus each of the light bulbs. Such string of lights may be made to terminate in a female socket to enable another light string to be cascaded from the light string.

Figure 1A:
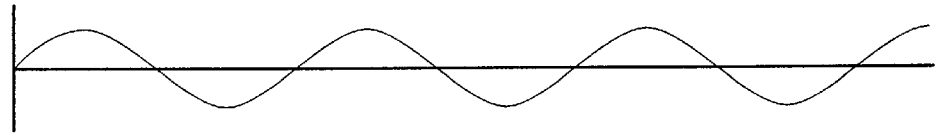
FIGS. 1A, 1B and 1C are graphs illustrating, respectively, alternating current, half-wave pulsed direct current and full-wave pulsed direct current versus time.
Figure 1B:
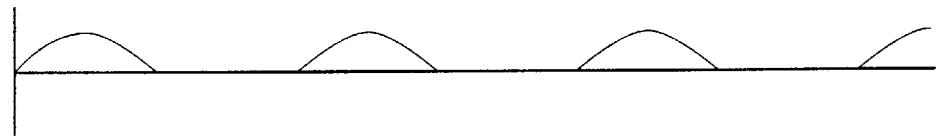
Figure 1C:
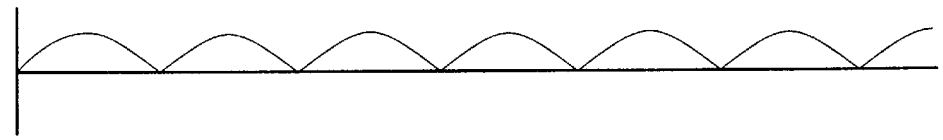
Figure 2:
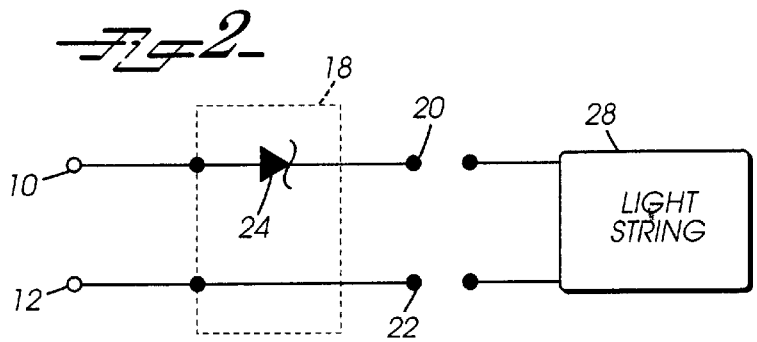
FIG. 2 is a circuit diagram according to a first preferred embodiment of the present invention.

One of several preferred, alternative embodiments is illustrated in FIG. 2. Inputs are generally indicated by reference numerals 10 and 12; outputs of an integrated circuit 18 are indicated by reference numbers 20 and 22.

The output of integrated circuit 18 is half-wave, 54 volts rectified DC for 120 volts AC input and is fed to a load such as the subsequent sockets of a light string 28.

Inside integrated circuit 18 is diode 24. Diode 24 acts as a half-wave rectifier and a fuse, and is referred to herein as a solid state rectifying fuse (SSRF) diode, or "Gibboney" diode, after the present inventor. The N junction of this diode is modified from that of conventional diodes to limit current.

If the design current for diode 24 is exceeded, say, going past 100 milliamperes during the positive current flow portion of the cycle, diode 24 will open in a manner similar to a fuse. The modification to diode 24 comprises forming a plurality of small conducting strips at the cathode that are sufficient in combination to carry the rated current. These strips are preferably on the order of one to ten microns in width. Diode 24 can be manufactured with a nominal rating of one or more amperes, but by burning out or severing some of the strips, its rating can be adjusted downward from the nominal rating for specific applications. In this sense, it is a programmable diode. For Christmas tree light strings, an amperage rating of 150 milliamps may be suitable.

Figure 3:
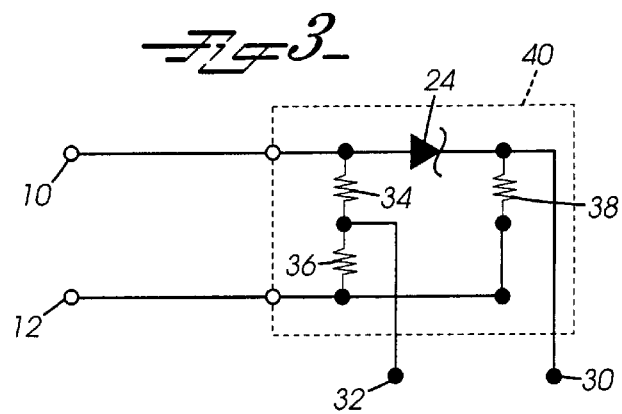
FIG. 3 is a circuit diagram according to a second, alternative preferred embodiment of the present invention.

FIG. 3 illustrates an alternative embodiment of the present invention. As with the embodiment shown in FIG. 2, there are inputs 10 and 12, outputs 30 and 32, and integrated circuit 40. There is also SSRF diode 24 and resistors 34, 36 and 38. The output of circuit 40 is full-wave rectification; however, the amplitude of the second half-wave is reduced compared to that of the first half-wave in order to limit current. Circuit 40 uses the negative half of the cycle to fill in between positive halves with a lower voltage pulse to keep the lamp filaments from cooling down. To achieve this result, the voltage of the positive half of the cycle passes through SSRF diode 24 and then to output 30.

During the negative half of the cycle, current flows across resistor 36 and then across resistor 34, but after the first of these two voltage drops, part of the current is tapped for output 32. The level of the output voltage from the negative half of the input cycle will depend on the ratio of resistors 34 to 36, and the magnitude of these resistors determines the amount of current that can be sourced by the load. This embodiment, especially when connected to a household current system having a 50 cycle frequency instead of 60, would avoid the shimmering effect that the embodiment of FIG. 2, or any other half-wave embodiment, would inevitably produce.

FIGS. 4A and 4B illustrate integrated circuits 18 and 40 modified as will be described below. However, components common to FIGS. 2 and 3 will have the same reference numbers to simplify the understanding of the drawings. In FIG. 4A, a circuit 50 is in line between inputs 10 and 12 and outputs 20 and 22. Diodes 24 and 26 have the same functions in circuit 50 as they do in circuit 18. In addition to diode 24, however, is a conventional thermistor 52, or other current-limiting devices, to vary the resistance with the temperature or voltage, generally increasing in resistance as its temperature rises. Here, until the rated current of thermistor 52 is exceeded, its resistance is very low. Once that current is exceeded, however, the temperature of thermistor 52 rises significantly as does its resistance, to the order of megaohms, essentially opening the circuit. Once current is interrupted, thermistor 52 cools down in a second or two.

FIG. 4B illustrates an integrated circuit 60 that parallels circuit 40 of FIG. 3, including inputs 10 and 12, outputs 30 and 32, diode 24, resistors 34, 36, and 38. Circuit 60 includes thermistor 52 for the same purposes as described with respect to circuit 50.

FIG. 5 illustrates yet another embodiment of the present invention. Between inputs 10 and 12 and outputs 20 and 22, is an integrated circuit 70 containing SSRF diode 24, as in the embodiments of FIGS. 2 and 4. In addition, integrated circuit 70 has thermistor 52 of embodiments 4A and 4B. These elements have the same functions as previously described. Integrated circuit 70 also has an optional full wave diode bridge 72 composed of four standard diodes 74 to feed full wave DC through SSRF diode 24.

Further, integrated circuit 70 has a programmable voltage array 76, a standard circuit element, in line so that the output voltage can be determined by the user, preferably by specifying that voltage to the manufacturer. Array 76 is a voltage divider or a chopper circuit, depending on the current demands of the application and is well known in the art. For a Christmas tree light string, a chopper circuit is preferred, and its frequency would be less than 10 kilohertz.

All of the foregoing integrated circuits, 18, 40, 50, 60 and 70 may be used in combination with an extraneous current load interrupter 80 which can sense a current leakage out of the loop by looking at the currents supplied by the source and demanded by the load. Interruptor 80's inputs 82 and 84 couple directly to outputs 20 and 22 of each of the integrated circuits. The voltage drop of the current flowing into each input 82, 84 of interrupter 80 is sampled using small, well-matched resistors 86 and 88, preferably on the order of one milliohm each, by operational amplifiers 90 and 92. The outputs of operational amplifiers 90 and 92 are input to a summing amplifier 94. As long as the currents in both inputs are the same, then the voltage of the outputs of operational amplifiers 90 and 92 at summing amplifier 94 are the same and its output is zero.

If there is a difference, on the order of one or two milliamps or less, then the output of summing amplifier 94 goes to saturation and causes a control logic element 96 to produce an "on" output that opens a solid state relay or switching device such, as CMOS 98, to interrupt power in the circuit. Because the control logic element 96 samples the output of summing amplifier 94 at least 1 megahertz frequency, shutting down after detecting extraneous currents takes about six clock cycles or less than one millisecond. To reset, the light socket incorporating interrupter 80 power source turned off and then reapplied. Interruptor 80 can be used with DC or AC.

These integrated circuits, with or without an extraneous current load interrupter, can be used with various small lights commonly found in conventional AC light strings, such as "minis", C7s and C9s, as well as other small lights used now in only DC applications, including the so-called "grain of rice" lights that run from ⅛th inches to ³⁄₁₆th inches long and ¹⁄₁₆th inches in diameter.

FIGS. 7 and 8 illustrate a front perspective view of a light string with cascading light string and schematic better demonstrating connection scheme, respectively, according to the present invention that is adapted for inclusion in a string of lights. First light socket 100 accommodated by housing 104, includes integrated circuit 110, which contains wires 102 which connect to plug 120 which is further connected to a power source (not shown in FIG. 7), to the next light socket 106 and to a female receptacle 130 for connection to cascading light string 140. Referring to FIG. 8, the power source 150 supplies alternating current to first light socket 100 whose output provides direct current to the subsequent light sockets 105 and tapped to supply direct current to the cascading light string 140.

It will be clear to those skilled in the art of integrated circuits and low voltage power supplies that many modifications and substitutions can be made to the foregoing preferred embodiments without departing from the spirit and scope of the invention, which is defined by the following claims.

What is claimed is:

1. A light socket to be connected to an electrical power means supplying alternating current, said light socket adapted to be part of an electrical circuit that delivers direct current to an electrical load and suitable to receive one light bulb, said light socket comprising:

a housing;

a pair electrical conducting wires running into said housing which electrically connects said light socket with said power means and said electrical load;

a solid state rectifying fuse diode, carried by said housing in electrical connection with said power means and said electrical load, for rectifying and limiting said alternating current from said power means so that only direct current flows to said electrical load, and if a pre-selected current level is reached, said diode will open said circuit and thereby stop it from conducting direct current to said load.

2. The light socket as recited in claim 1, further comprising means connected between said diode and said wires for detecting differences between electrical currents in said wires, when said wires are attached to said electrical load and said diode.

3. The light socket as recited in claim 2, further comprising means responsive to said detecting means for halting the flow of direct current to the said load when a difference is detected by said detecting means.

4. The light socket as recited in claim 1, further comprising means for limiting current to said diode.

5. The light socket as recited in claim 4, wherein said limiting means is selected from the group consisting of a thermistor and a fuse.

6. The light socket as recited in claim 1, further comprising a full-wave rectifying bridge connected between said wires and said diode.

7. The light socket as recited in claim 1, wherein said diode produces a half-wave in each cycle of said alternating current, said half wave having a first amplitude, and further comprising means in electrical connection between said power means and said diode for producing a second half-wave in each of said cycles, said second-half wave having a second amplitude equal to or lower than said first amplitude.

8. A light string, comprising:

a plurality of light bulbs;

a plurality of light sockets each adapted to receive one light bulb and with a first light socket to be connected to an electrical power means supplying alternating current, said first light socket adapted to be part of an electrical circuit that delivers direct current to a second plurality of light sockets, said first light socket comprising a housing;

a pair of electrical conducting wires running into said housing which electrically connects said first light socket with said power means and said second plurality of light sockets;

a solid state rectifying fuse diode, carried by said housing in electrical connection with said power means and said second plurality of light sockets, for rectifying and limiting said alternating current from said power means so that only direct current flows to said second plurality of light sockets, and if a pre-selected current level is reached, said diode will open said circuit and thereby stop it from conducting direct current to said second plurality of light sockets electrical connectors interconnecting said light sockets.

9. The light string as recited in claim 8, wherein said power means is a plug to be connected to an electrical outlet.

10. The light string as recited in claim 8, further consisting a electrical female receptacle, with first and second contact, where said second contact is connected to the last light socket in said light string and said first contact is connected to the output of said first light socket.

11. The light string as recited in claim 8, wherein said diode produces a half-wave in each cycle of said alternating current, said half wave having a first amplitude, and further comprising means in electrical connection between said power means and said diode for producing a second half-wave in each of said cycles, said second-half wave having a second amplitude equal to or lower than said first amplitude.

12. The light string as recited in claim 8, further comprising a current-limiting device carried by said circuit between said power means and said diode for limiting current to said diode.

13. The light string as recited in claim 8, further comprising a rectifying bridge carried by said circuit between said power means and said diode.

14. The light string as recited in claim 8, further comprising:

means connected between said diode and said power means for detecting differences between electrical currents in said power means when said wires are attached to said second plurality of light sockets and said diode; and means responsive to said detecting means for halting the flow of direct current to the load when a difference is detected by said detecting means.

15. The light string as recited in claim 14, wherein said diode produces a half-wave in each cycle of said alternating current, said half-wave having a first amplitude, and further comprising:

means in electrical connection between power means and said diode for producing a second half-wave in each of said cycles, said second half-wave having a second amplitude lower than said first amplitude; and a current-limiting device carried by said circuit between said power means and said diode for limiting current to said diode.

* * * * *